US011425092B2

United States Patent
Cohen

(10) Patent No.: US 11,425,092 B2
(45) Date of Patent: Aug. 23, 2022

(54) SYSTEM AND METHOD FOR ANALYTICS BASED WAF SERVICE CONFIGURATION

(71) Applicant: RADWARE, LTD., Tel Aviv (IL)

(72) Inventor: Dekel Cohen, Neve Yarak (IL)

(73) Assignee: Radware, Ltd., Tel Aviv (IL)

( * ) Notice: Subject to any disclaimer, the term of this patent is extended or adjusted under 35 U.S.C. 154(b) by 263 days.

(21) Appl. No.: 16/883,373

(22) Filed: May 26, 2020

(65) Prior Publication Data

US 2021/0377216 A1    Dec. 2, 2021

(51) Int. Cl.
| | |
|---|---|
| *H04L 29/06* | (2006.01) |
| *H04L 9/40* | (2022.01) |
| *H04L 67/02* | (2022.01) |
| *H04L 9/32* | (2006.01) |
| *H04L 9/06* | (2006.01) |

(52) U.S. Cl.
CPC ........ *H04L 63/0236* (2013.01); *H04L 9/0643* (2013.01); *H04L 9/3247* (2013.01); *H04L 63/0263* (2013.01); *H04L 63/1416* (2013.01); *H04L 63/1425* (2013.01); *H04L 67/02* (2013.01)

(58) Field of Classification Search
CPC . H04L 63/0236; H04L 9/0643; H04L 9/3247; H04L 63/0263; H04L 63/1416; H04L 63/1425; H04L 67/02
See application file for complete search history.

(56) References Cited

U.S. PATENT DOCUMENTS

| | | | | |
|---|---|---|---|---|
| 2017/0093795 | A1* | 3/2017 | Fruth | H04L 63/1425 |
| 2017/0093892 | A1* | 3/2017 | Prokudin | G06F 21/561 |
| 2018/0020002 | A1* | 1/2018 | Duca | G06F 21/572 |
| 2018/0375830 | A1* | 12/2018 | Delaney | H04L 63/0218 |
| 2019/0026466 | A1* | 1/2019 | Krasser | G06N 20/20 |

OTHER PUBLICATIONS

Ezeme, Okwudili M., Qusay H. Mahmoud, and Akramul Azim. "Dream: deep recursive attentive model for anomaly detection in kernel events." IEEE Access 7 (2019): 18860-18870. (Year: 2019).*

* cited by examiner

*Primary Examiner* — Joseph P Hirl
*Assistant Examiner* — Ka Shan Choy
(74) *Attorney, Agent, or Firm* — M&B IP Analysts, LLC

(57) ABSTRACT

A method and system for configuring a web application firewall (WAF) device. The system includes continuously receiving events of an event log associated with a first web based application; generating for each event a signature using a local sensitive hash function; populating a Markov model based on signatures generated for the events, wherein each node in the Markov model corresponds to a generated signature; generating a first new signature for a first new received event, and a second new signature for a second new received event, wherein the second event is subsequent to the first event; determining a probability based on the Markov model that the second event is subsequent to the first event, by locating a first node corresponding to the first new signature and a second node corresponding to the second new signature; and authorizing a request associated with the second event, in response to determining that the determined probability exceeds a predefined threshold.

19 Claims, 7 Drawing Sheets

SYSTEM AND METHOD FOR ANALYTICS BASED WAF SERVICE CONFIGURATION

TECHNICAL FIELD

The disclosure generally relates to web application firewalls (WAFs) and particularly to configuration of WAFs.

BACKGROUND

Web applications are advantageous for a number of reasons, among them that the application can be updated easily by the author(s) from a single point, it eliminates having multiple versions of software 'in the wild', and in general provides the author with more control over their software. Web applications also provides users with the ability to use applications without requiring downloading special software, libraries, plugins, and so on. Web applications, however, are also vulnerable to web-based threats, and as such require security solutions.

To be protected, companies heavily invest in security solutions, such as anti-virus software and firewalls. However, as security solutions become more and more advanced so do web attacks. Web attacks may be in form of viruses, worms, Trojan horses, script-based, system intrusions, and many others. Such attacks allow the attacker to control computers, access confidential information, and destroy valuable data.

One such solution is a web application firewall (WAF). A WAF is typically deployed in-line of traffic between clients and a server hosting a protected web-applications. A WAF filters, monitors, and blocks hypertext transfer protocol (HTTP) traffic to and from a web application. This is achieved by supplying the WAF with authorization rules or security policies to determine what traffic should be filtered, blocked, or let through. The security policies are configured based on known attack patterns or vulnerable application-paths. Such policies may be defined as blocklist (what should be block) or whitelist (what should be allowed)

One solution suggests manually configuring WAF polices. However, such approach is efficient as it requires advance knowledge of known attack patterns or paths. Configuring a WAF for controlling access to an application can be a time consuming and human error-prone process. Furthermore, customer's requirements are not static and indeed fluctuate based for example on their development and business needs. This may lead to outdated, flawed and therefore even dangerous misconfigurations of WAF. Additionally, some of the required values for configuration are not obvious and this fact complicates both onboarding and re-configuration of the WAF service. This complexity affects not only the time required for configuration, but the quality of such a configuration as well.

Furthermore, as web applications are dynamically changed by programmers and the system administrator often does not have full control over all these rapidly occurring changes, many of them being reported afterwards, if at all. Thus, the policy is statically enforced, and thus the web applications remain vulnerable.

Other solution suggest crawling the web-applications to learn the structure of an application and generate policies based on the crawling. As this is solution is not a static solution, yet crawling cannot be rapidly adapted to capture changes in web applications. In today's computing environment, applications may be in changes every a few seconds (e.g., online retail sales).

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for configuring a web application firewall (WAF) device. The method comprising: continuously receiving events of an event log associated with a first web based application; generating for each event a signature using a local sensitive hash function; populating a Markov model based on signatures generated for the events, wherein each node in the Markov model corresponds to a generated signature; generating a first new signature for a first new received event, and a second new signature for a second new received event, wherein the second event is subsequent to the first event; determining a probability based on the Markov model that the second event is subsequent to the first event, by locating a first node corresponding to the first new signature and a second node corresponding to the second new signature; and authorizing a request associated with the second event, in response to determining that the determined probability exceeds a predefined threshold.

Certain embodiments disclosed herein also include a system for configuring a web application firewall (WAF) device. The system comprising: a network card interface to allow a network connection; a processing circuitry; and a memory, the memory containing instructions that, when executed by the processing circuitry, configure the system to: continuously receive events of an event log associated with a first web based application; generate for each event a signature using a local sensitive hash function; populate a Markov model based on signatures generated for the events, wherein each node in the Markov model corresponds to a generated signature; generate a first new signature for a first new received event, and a second new signature for a second new received event, wherein the second event is subsequent to the first event; determine a probability based on the Markov model that the second event is subsequent to the first event, by locating a first node corresponding to the first new signature and a second node corresponding to the second new signature; and authorize a request associated with the second event, in response to determining that the determined probability exceeds a predefined threshold.

BRIEF DESCRIPTION OF THE DRAWINGS

The subject matter of the disclosure is particularly pointed out and distinctly claimed in the claims at the conclusion of the specification. The foregoing and other objects, features and advantages will become apparent and more readily appreciated from the following detailed description taken in conjunction with the accompanying drawings, in which:

DETAILED DESCRIPTION

Figure 1:
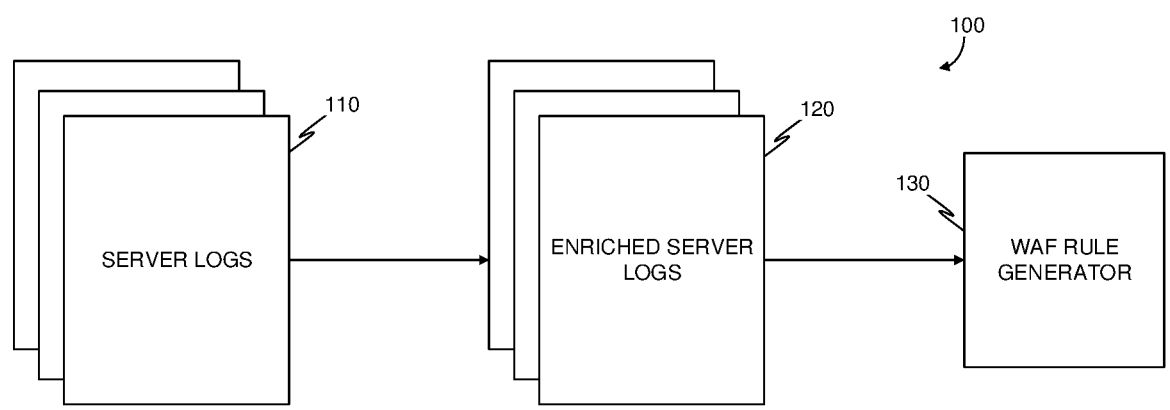
FIG. 1 is a schematic illustration of system implemented according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is a schematic illustration 100 of enriched data logs, generated and implemented in accordance with an embodiment. A plurality of server logs 110 are generated by a server (not shown) in a network environment. Server logs typically store data in Common Log Format. The Common Log Format is useful as it is a standardized format used across the web. However, such format also means that such logs are limited in terms of the information which they are able to provide. One way to overcome this is to extend the format, for example, by utilizing Combined Log Format.

In an embodiment, each server log 110 is enriched by generating a reciprocal enriched log for each server log. The enriched server logs may include different types of enrichment, e.g., based on server data, client data, and contextual data. Server data may include a signature, resource locater, meta tags, keywords extracted from a request, or referral page load. The signature may be generated using an LSH (local sensitive hash) function, which would allow grouping of similar requests. Similar requests may be, for example, requesting a resource in a format for a mobile device, and requesting the same resource in a format for desktop viewing.

Client data may be device type, device signature, cached data, and the like. A device signature may be for example a MAC address. Contextual data may be for example number of packets, pixel display size, header sample, XFF referral headers (or other CDN derived metadata), and the like. For each server log 110 a corresponding enriched server log 120 is generated. The enriched server logs 120 are provided as input to a WAF rule generator 130 configured to generate access rules based on the data provided by the enriched server logs 120. In an embodiment, the WAF rule generator 130 includes a signature generator which is discussed in more detail below.

Figure 2:
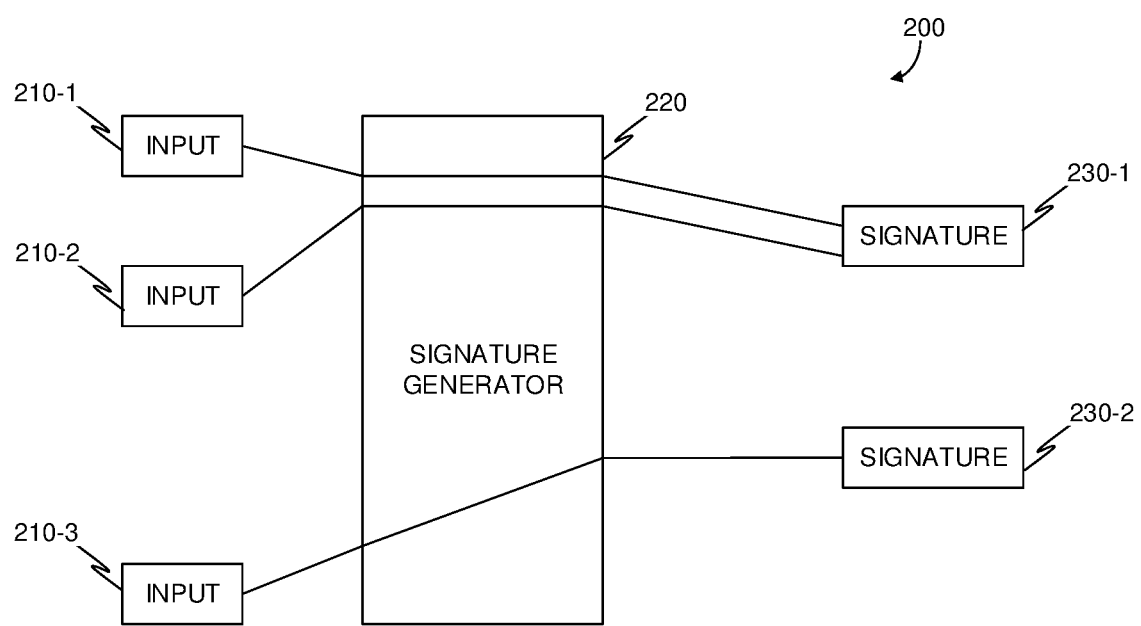
FIG. 2 is a schematic illustration of a WAF signature generator implemented in accordance with an embodiment

FIG. 2 is a schematic illustration 200 of a WAF signature generator 220 implemented in accordance with an embodiment. The WAF signature generator 220 is configured to receive a plurality enriched server logs. Each enriched server log includes rows corresponding to events, such as requests for data from the server, actions performed by the server, and the like.

The WAF signature generator 200 is configured to generate a signature based on each event. The signature may be generated using an LSH (local sensitive hash) function, which would allow grouping of similar events. This may be beneficial to tie together events. The generated signatures can be stored as objects, for example, in an object-oriented database. In this example, the WAF signature generator 220 is provided with a plurality of inputs: a first input 210-1, a second input 210-2, and a third input 210-3. Each input corresponds to an event from a server log. A first signature 230-1 is generated based on the first input 210-1. The first signature 230-1 is also the signature generated for the second input 210-2.

In this example, the first event is a request to receive a web resource in a format for a mobile device, and the second event is a request to receive the same web resource in a format for a desktop device. As the requests are similar enough, a feature of the LSH is that it would map both requests to the same signature (first signature 230-1). The third input 210-3 is mapped to a second signature 230-2. In an embodiment, signatures may be clustered into higher level objects which are application signatures. Such application signatures combine a plurality of signatures and may be indicative of an entire application or web service.

Figure 3:
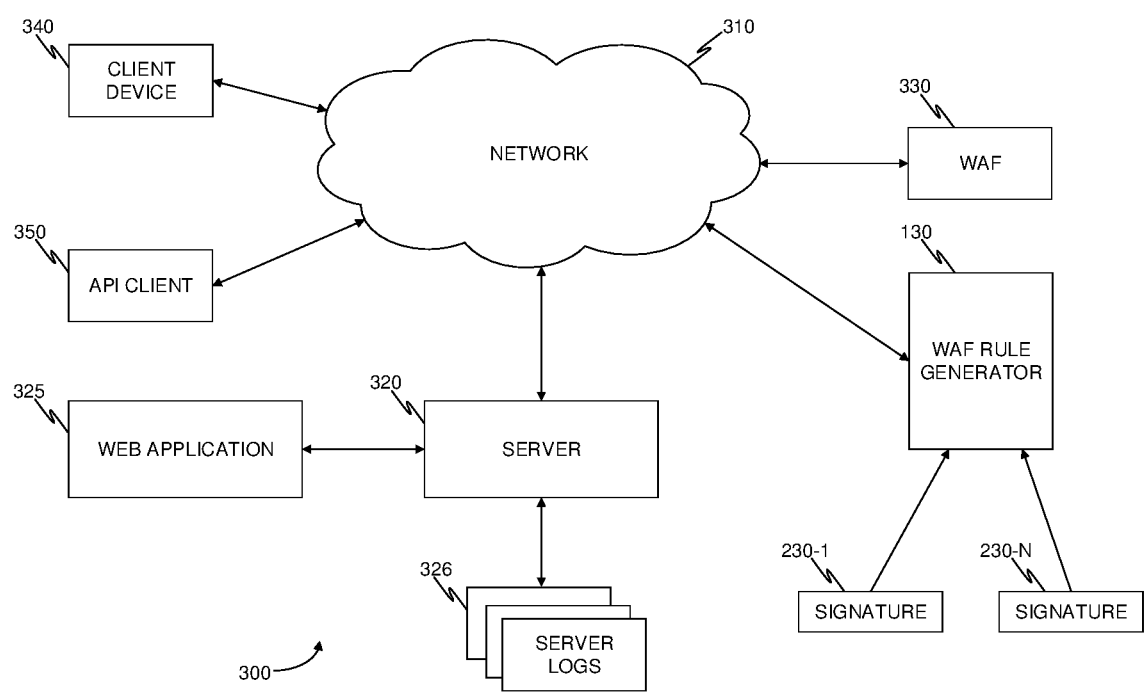
FIG. 3 is a schematic illustration of a network diagram utilized to describe the various embodiments.

FIG. 3 is a schematic illustration of a network diagram 300 utilized to described the various embodiments. A network 310 is configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity.

A server 320 is connected to the network 310, which is operative to supply a web based service or application, such as web application 325. The web application 325 includes a plurality of resources, such as media files (movies, pictures, sound, etc.) and text. The server 320 is further configured to receive requests from client devices and APIs for resources of the web application 325.

In an embodiment, the web application 325 is protected by a WAF 330, such that each request received from a client device 340 or from API 350 is first routed through the WAF to determine if the request is valid. A WAF 330 may determine that a request is valid based on whitelist or blacklist policies. The purpose of a policy, which includes a plurality of rules, is to determine what network traffic is normal, and should therefore be allowed, and what network traffic is suspicious, or otherwise not normal, and should therefore be blocked. A client device or API generates a request for a resource from the web application 325. The request is received at the WAF 330. During an initial training period, the WAF 330 may be in passive mode (also referred to as learning mode).

In a learning mode, the WAF 330 attempts to ascertain what normal traffic is. This can be performed, for example, in cleanroom conditions by having only preauthorized clients use the web application as a typical user would be expected to. Such operations are already often performed during quality assurance testing of such web resources. The server 320 is configured to generate server logs 326 such as discussed above with respect to FIG. 1. The server logs 326 are enriched, and signatures 230-1 through 230-N (where 'N' is a natural number having a value of '2' or greater) are generated and provided to the WAF rule generator 130.

The WAF rule generator 130 is further configured to generate access rules based on the generated signatures. For example, an event which is mapped to a first signature 230-1 may be whitelisted by the WAF rule generator 130. Subsequently, any new events which can be mapped to the same signature will be approved by the WAF. Using LSH functions can allow similar access requests to be whitelisted simultaneously, removing the need to whitelist each variation of such request (e.g. mobile vs. desktop).

In another embodiment, the signatures may be stored as objects in an object storage. The objects may comprise together a tree data structure, such as a Markov model (or hidden Markov model—HMM). By utilizing such a probability tree, a determination may be made as to a probable order of events. For example, resources may be requested in a typical fashion. If a request arrives which is not typical of a normal requesting pattern, that request may be denied. As a simplistic example, it is unlikely a client device will request a single resource some high number of times repetitively at regular intervals. However, this is a case which is typical of a denial of service (DoS) or distributed DoS (DDoS) type cyberattack. This is discussed in greater detail in FIG. 4 below.

Figure 4:
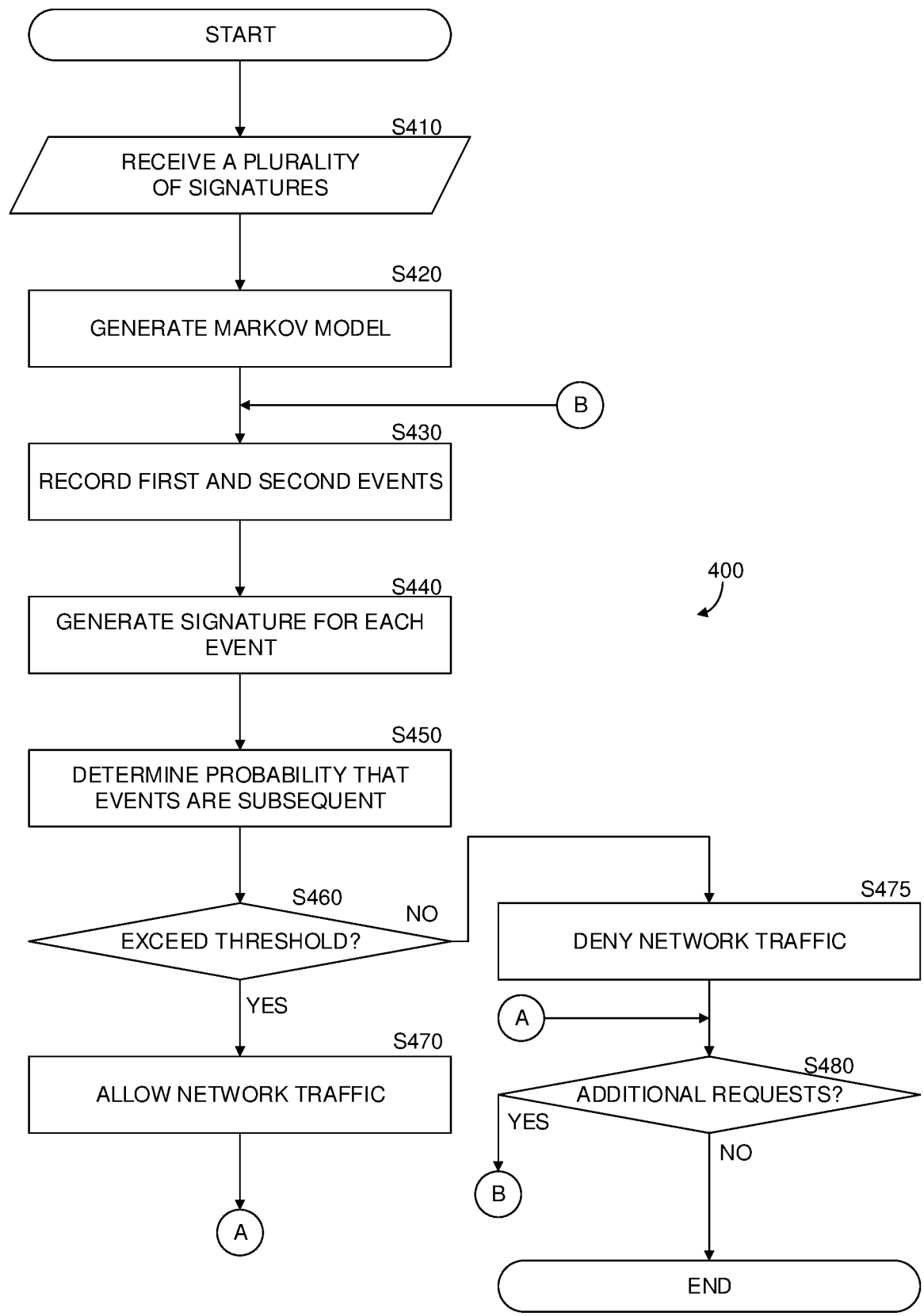
FIG. 4 is a flowchart of a method for utilizing signatures to whitelist network traffic, implemented in accordance with an embodiment.

FIG. 4 is an example flowchart 400 of a method for utilizing signatures to whitelist network traffic, implemented in accordance with an embodiment.

At S410, a plurality of signatures are received. In an embodiment the signatures may be received with a sequential indicator (such as a timestamp, or time interval) to determine an order in which events correlated to the signatures were generated.

At S420, a hidden Markov model is generated based on the received plurality of signatures, such that each signature corresponds to a node of the tree. At S430, a first event and second event are recorded, such that the second event is subsequent to the first event. The events may correspond, for example, to a request for a web-based resource.

At S440, a signature is generated for each event, such that a first signature corresponds to the first event and a second signature corresponds to the second event. In an embodiment, each signature is generated using a local sensitive hash.

At S450 a probability that the second event occurs subsequent to the first event is determined. For example, in an embodiment probability is determined based on the HMM. In an embodiment, S450 includes locating a first node corresponding to the first new signature and a second node corresponding to the second new signature.

At S460, a check is performed to determine if the probability is at or over a predefined threshold. If 'yes' execution continues at S470, if 'no' execution continues at S475.

At S470, the network traffic is determined to be allowed, and a WAF may thus indicate to the server to serve the request. Otherwise, at S475 the network traffic is denied, and at least the request corresponding to the second event is not allowed by the WAF to reach the server.

At S480 a check is performed to determine if additional requests exist. If 'yes' execution may continue at S430; Otherwise, execution terminates.

Figure 5:
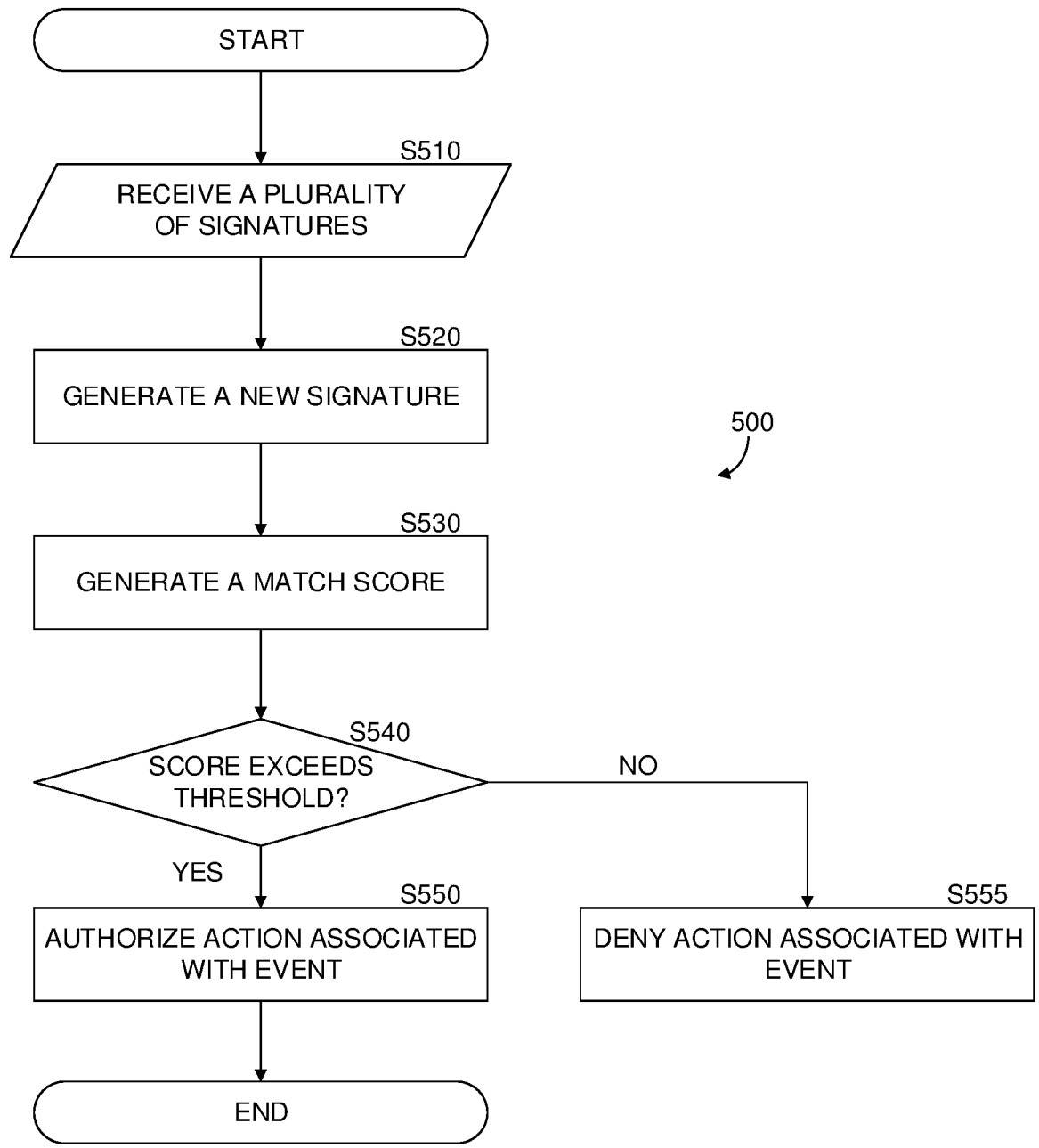
FIG. 5 is a flowchart of a method for whitelisting network traffic based on preauthorized signatures, implemented in accordance with an embodiment.

FIG. 5 is an example flowchart 500 of a method for whitelisting network traffic based on preauthorized signatures, implemented in accordance with an embodiment.

At S510, a plurality of signatures are received. In an embodiment the signatures may be received with a sequential indicator (such as a timestamp, or time interval) to determine an order in which events correlated to the signatures were generated. The received signatures are indicative of authorized network traffic.

At S520, a new signature is generated based on an event of a current browsing session. At S530, a match score is generated between the new signature and one or more of the plurality of received signatures. The match score may be computed as a function of the overlap between two or more signatures.

At S540, a check is performed to determine if the match score is at or exceeds a predefined threshold. If 'yes' execution continues at S550, otherwise execution continues at S555.

At S550, an action associated with the event (such as a request for a web resource) is authorized. This may lead, for example, to a WAF sending a request to a web application.

At S555, the action associated with the event is denied. In an embodiment, a notification may be generated and sent to the client device to indicate that the received request was denied.

Figure 6:
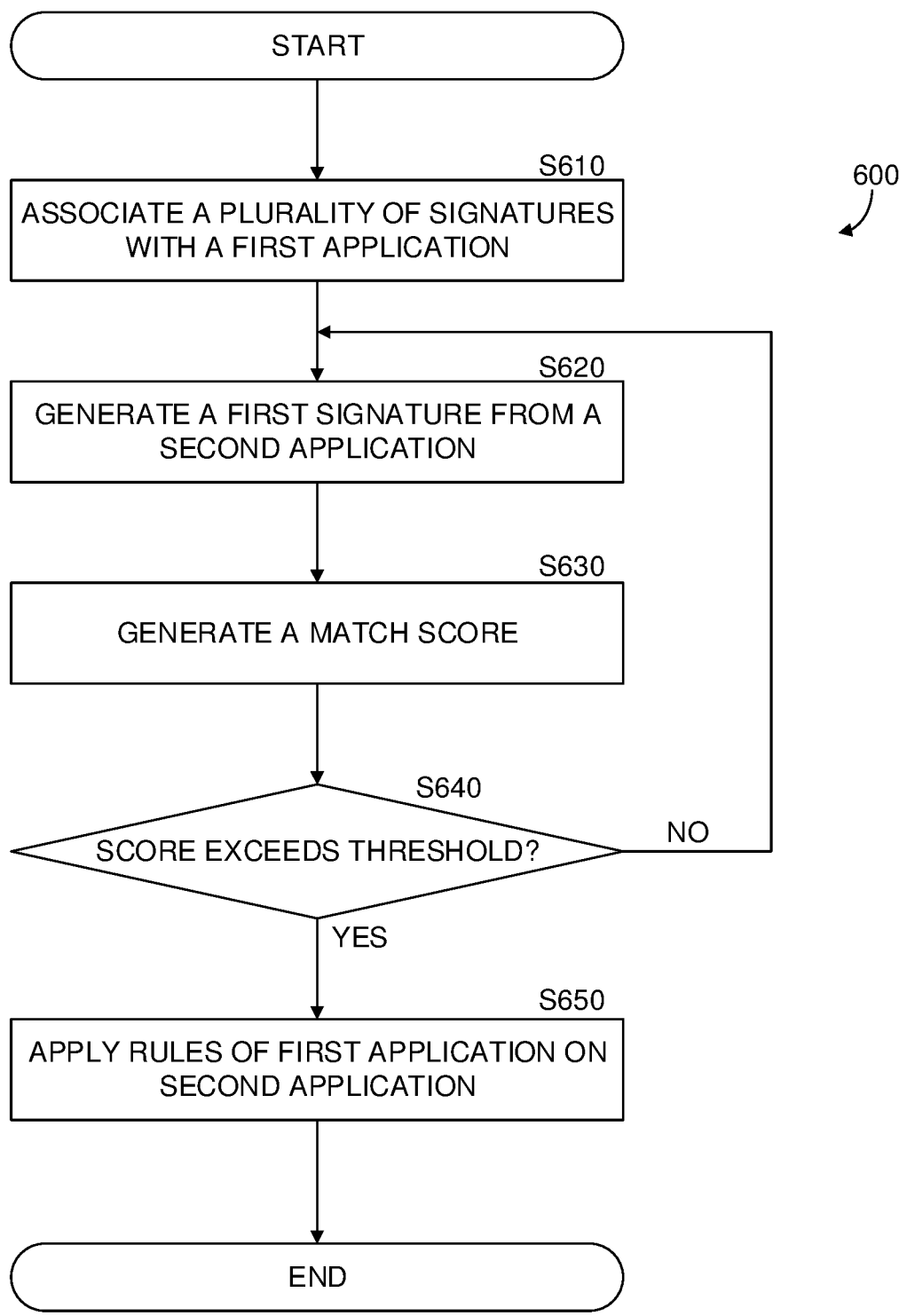
FIG. 6 is a flowchart of a method for populating rules for a first WAF based on a second WAF, implemented in accordance with an embodiment.

FIG. 6 is an example flowchart 600 of a method for populating rules for a first WAF based on a second WAF, implemented in accordance with an embodiment.

At S610, a plurality of generated signatures are associated with a first web-based application. Associating the signatures with the first web-based application may be based on IP address, keywords determined in server logs or enriched server logs, etc. A WAF is configured to have authorization rules associated with the first web-based application.

At S620, a first signature of an event directed at a second web-based application is generated.

At S630, a match score is generated between the first signature and one or more of the plurality of signatures.

At S640, a check is performed to determine if any of the generated match scores are at or exceed a predefined threshold. If 'yes' execution continues at S650, otherwise execution terminates. In another embodiment rather than terminating, execution may continue at S620.

At S650 rules applied by the WAF to the first web-based application are applied to the second web-based application.

According to some example embodiments the processes described with references to FIGS. 4-6 are performed by the WAF rule generator 130.

Figure 7:
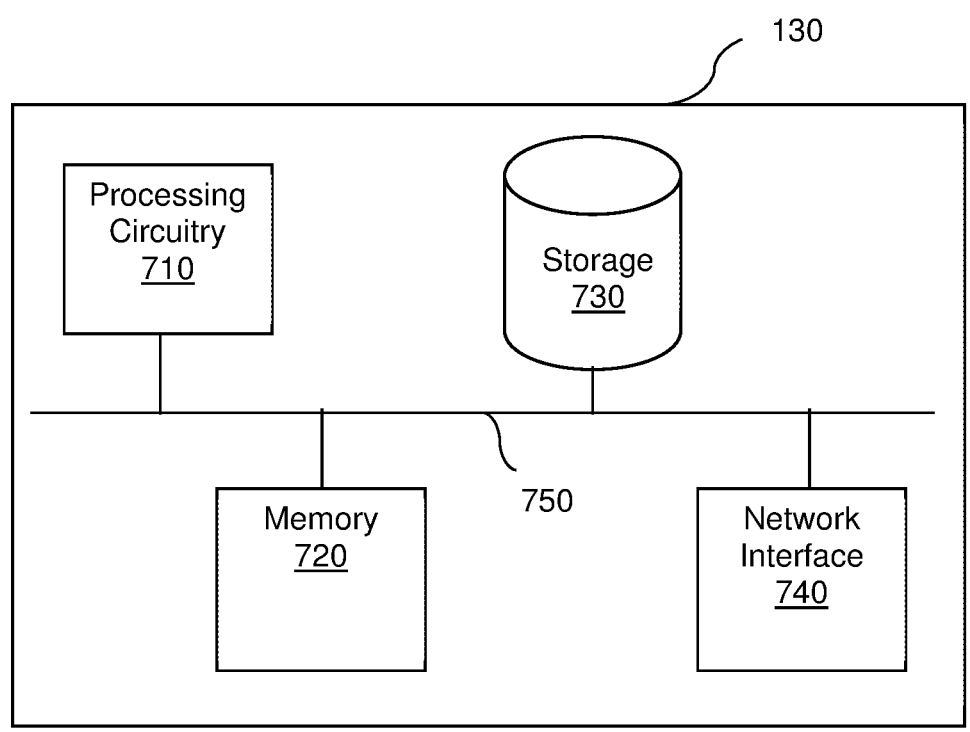
FIG. 7 is a schematic diagram of a WAF rule generator according to an embodiment.

FIG. 7 is an example schematic diagram of a WAF rule generator 130 according to an embodiment. The WAF rule generator 130 includes a processing circuitry 710 coupled to a memory 720, a storage 430, and a network interface 740. In an embodiment, the components of the WAF rule generator 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., RAM, etc.), non-volatile (e.g., ROM, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, CD-ROM, Digital Versatile Disks (DVDs), or any other medium which can be used to store the desired information. The storage 730 may store, for example, the generated rules.

The network interface 740 allows the WAF rule generator 130 to communicate with the, for example the signature network and any type of network, as discussed with reference to FIG. 3.

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for configuring a web application firewall (WAF) device, comprising:
    continuously receiving events of an event log associated with a first web based application;
    generating for each event a signature using a local sensitive hash function;
    populating a Markov model based on signatures generated for the events, wherein each node in the Markov model corresponds to a generated signature;
    generating a first new signature for a first new received event, and a second new signature for a second new received event, wherein the second event is subsequent to the first event;
    determining a probability based on the Markov model that the second event is subsequent to the first event, by locating a first node corresponding to the first new signature and a second node corresponding to the second new signature; and
    authorizing a request associated with the second event, in response to determining that the determined probability exceeds a predefined threshold.

2. The method of claim 1, further comprising:
    generating access rules based on at least the first new signature and the second new signature.

3. The method of claim 2, further comprising:
    mapping a new received event to at least previously generated signature; and
    allowing a new request associated with the new received event, when the new received event is mapped to a previously generated signature.

4. The method of claim 2, further comprising:
    populating the WAF device with the generated access rules for a second web-based application.

5. The method of claim 1, further comprising:
    storing each generated signature as an object in an object storage.

6. The method of claim 1, further comprising:
    storing the Markov model in a memory of the WAF device.

7. The method of claim 1, further comprising:
    denying the request associated with the second event, in response to determining that the determined probability does not exceed a predefined threshold, wherein a denied request is indicative of a potential denial of service cyberattack.

8. The method of claim 1, further comprising:
    continuously receiving during a first operation period events of an event log associated with the first web based application;
    generating for each event in the event log a signature using a local sensitive hash function; and
    grouping at least a first group of signatures from the generated signatures into an authorized group, wherein the authorized group includes signatures which correspond to network traffic which is authorized traffic.

9. The method of claim 8, further comprising:
    generating a new signature for a new received event, the new received event received during a second operation period;
    generating a match score between the new signature and one or more of the generated signatures; and
    authorizing a request associated with the new received event, in response to determining that the generated match score exceeds a predefined threshold.

10. A non-transitory computer readable medium having stored thereon instructions for causing a processing circuitry to execute a process for configuring a web application firewall (WAF) device, the process comprising:
    continuously receiving events of an event log associated with a first web based application;

generating for each event a signature using a local sensitive hash function;

populating a Markov model based on signatures generated for the events, wherein each node in the Markov model corresponds to a generated signature;

generating a first new signature for a first new received event, and a second new signature for a second new received event, wherein the second event is subsequent to the first event;

determining a probability based on the Markov model that the second event is subsequent to the first event, by locating a first node corresponding to the first new signature and a second node corresponding to the second new signature; and authorizing a request associated with the second event, in response to determining that the determined probability exceeds a predefined threshold.

11. A system for configuring a web application firewall (WAF) device, comprising:

a network card interface to allow a network connection;

a processing circuitry; and a memory, the memory containing instructions that, when executed by the processing circuitry, configure the system to:

continuously receive events of an event log associated with a first web based application;

generate for each event a signature using a local sensitive hash function;

populate a Markov model based on signatures generated for the events, wherein each node in the Markov model corresponds to a generated signature;

generate a first new signature for a first new received event, and a second new signature for a second new received event, wherein the second event is subsequent to the first event;

determine a probability based on the Markov model that the second event is subsequent to the first event, by locating a first node corresponding to the first new signature and a second node corresponding to the second new signature; and authorize a request associated with the second event, in response to determining that the determined probability exceeds a predefined threshold.

12. The system of claim 11, wherein the system is further configured to:

generate access rules based on at least the first new signature and the second new signature.

13. The system of claim 12, wherein the system is further configured to:

map a new received event to at least previously generated signature; and allow a new request associated with the new received event, when the new received event is mapped to a previously generated signature.

14. The system of claim 12, wherein the system is further configured to:

populate the WAF device with the generated access rules for a second web-based application.

15. The system of claim 11, wherein the system is further configured to:

store each generated signature as an object in an object storage.

16. The system of claim 11, wherein the system is further configured to:

store the Markov model in a memory of the WAF device.

17. The system of claim 11, wherein the system is further configured to:

deny the request associated with the second event, in response to determining that the determined probability does not exceed a predefined threshold, wherein a denied request is indicative of a potential denial of service cyberattack.

18. The system of claim 11, wherein the system is further configured to:

continuously receive during a first operation period events of an event log associated with the first web based application;

generate for each event in the event log a signature using a local sensitive hash function; and group at least a first group of signatures from the generated signatures into an authorized group, wherein the authorized group includes signatures which correspond to network traffic which is authorized traffic.

19. The system of claim 18, wherein the system is further configured to:

generate a new signature for a new received event, the new received event received during a second operation period;

generate a match score between the new signature and one or more of the generated signatures; and authorize a request associated with the new received event, in response to determining that the generated match score exceeds a predefined threshold.

* * * * *